US011860125B2

(12) United States Patent
Batra et al.

(10) Patent No.: US 11,860,125 B2
(45) Date of Patent: Jan. 2, 2024

(54) PROGNOSTICS SYSTEM FOR DETECTING WEAR IN ENCODERS USED TO SENSE WHEEL SPEED IN VEHICLES

(71) Applicant: GM GLOBAL TECHNOLOGY OPERATIONS LLC, Detroit, MI (US)

(72) Inventors: Mohit Batra, Kitchener (CA); Jasmeet Singh Ladoiye, Carleton Place (CA); Milad Alekajbaf, North York (CA); Douglas James Spry, Auburn Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 373 days.

(21) Appl. No.: 17/317,697

(22) Filed: May 11, 2021

(65) Prior Publication Data

US 2022/0365030 A1 Nov. 17, 2022

(51) Int. Cl.
*G01N 27/82* (2006.01)
*B60T 8/175* (2006.01)
*B60T 8/172* (2006.01)
*B60T 8/1755* (2006.01)
*G06F 18/25* (2023.01)

(52) U.S. Cl.
CPC .............. *G01N 27/82* (2013.01); *B60T 8/172* (2013.01); *B60T 8/175* (2013.01); *B60T 8/17551* (2013.01); *G06F 18/254* (2023.01)

(58) Field of Classification Search
CPC ......... G01N 27/82; B60T 8/172; B60T 8/175; B60T 8/17551
See application file for complete search history.

(56) References Cited

U.S. PATENT DOCUMENTS

2017/0297584 A1* 10/2017 Chen ..................... B60T 8/1755
2023/0219576 A1* 7/2023 Lee .................. B60W 50/0098
701/74

* cited by examiner

*Primary Examiner* — Minh Q Phan

(57) ABSTRACT

A system for detecting wear in an encoder used to sense a wheel speed in a vehicle comprises a sensor configured to sense the wheel speed of the vehicle by sensing a magnetic material on the encoder coupled to a wheel of the vehicle. A noise detection module includes a plurality of noise detectors configured to detect noise in a wheel speed signal generated by the sensor. An estimation module is configured to estimate a state of health of the encoder based on the noise detected in the wheel speed signal and to generate an alert in response to the state of health indicating that an amount of wear on the encoder is greater than a predetermined threshold. A filter is configured to filter the noise in the wheel speed signal and to output a filtered wheel speed signal to a control system controlling stability of the vehicle.

20 Claims, 6 Drawing Sheets

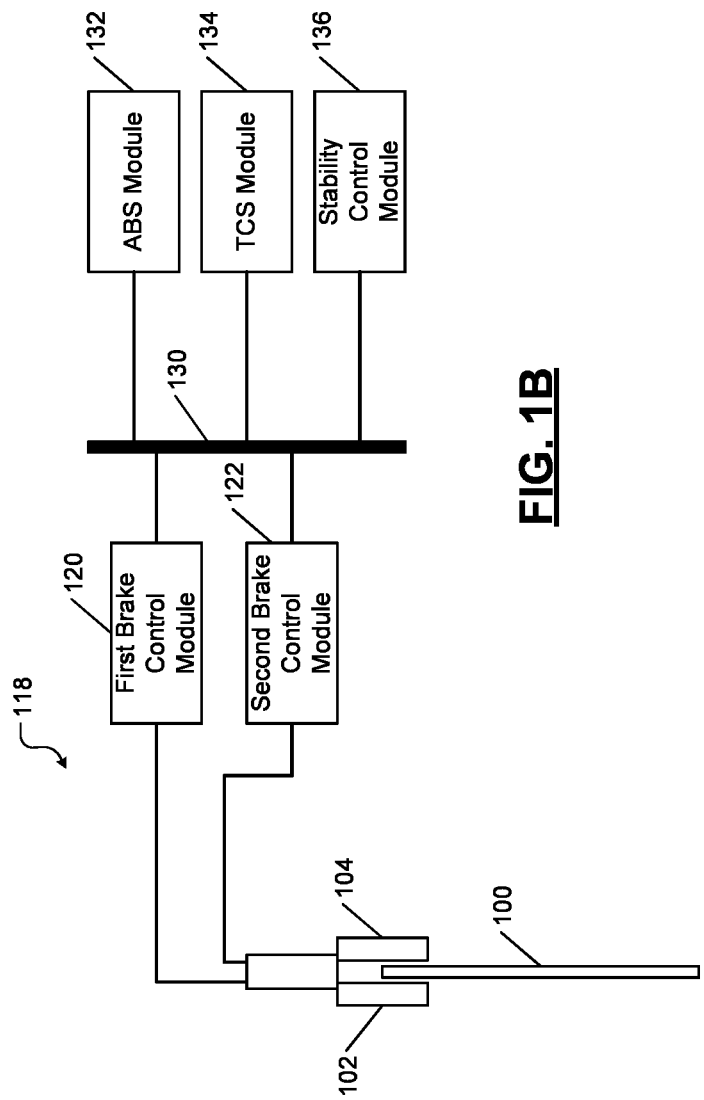
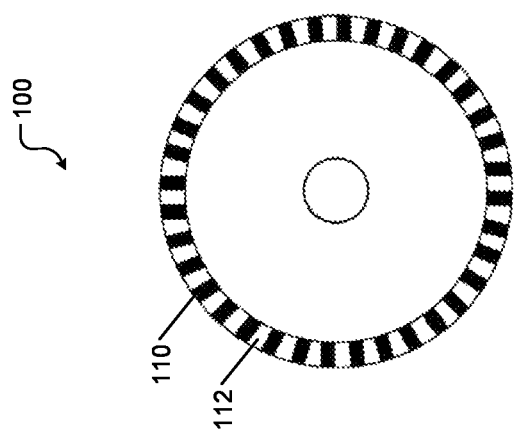
FIG. 1B
FIG. 1A

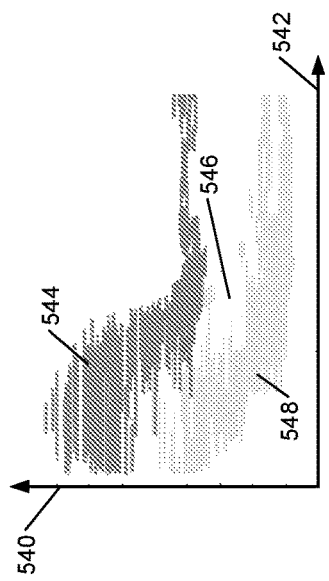
FIG. 5E
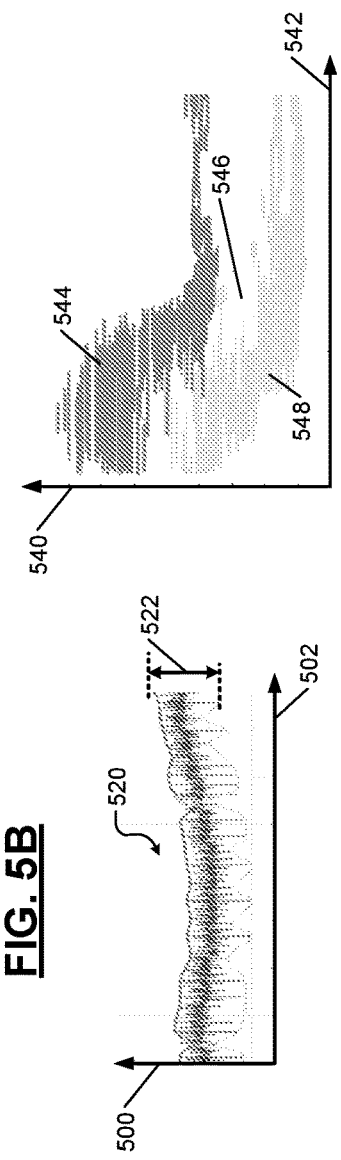
FIG. 5B
FIG. 5C
FIG. 5D
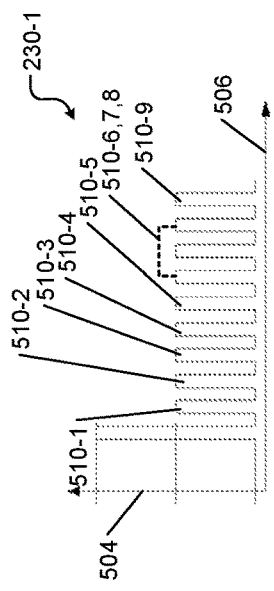
FIG. 5A

PROGNOSTICS SYSTEM FOR DETECTING WEAR IN ENCODERS USED TO SENSE WHEEL SPEED IN VEHICLES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to sensing wheel speed in vehicles and more particularly to a prognostics system for detecting wear in encoders used to sense wheel speed in vehicles.

In many vehicles, including autonomous and semi-autonomous vehicles, wheel speed is measured to maintain vehicle stability. For example, an antilock brake system (ABS), a traction control system (TCS), and a stability control system of a vehicle maintain vehicle stability based on the wheel speed sensed by wheel speed sensors.

SUMMARY

A system for detecting wear in an encoder used to sense a wheel speed in a vehicle comprises a sensor, a noise detection module, an estimation module, and a filter. The sensor is configured to sense the wheel speed of the vehicle by sensing a magnetic material on the encoder coupled to a wheel of the vehicle. The noise detection module includes a plurality of noise detectors configured to detect noise in a wheel speed signal generated by the sensor. The estimation module is configured to estimate a state of health of the encoder based on the noise detected in the wheel speed signal and to generate an alert in response to the state of health indicating that an amount of wear on the encoder is greater than a predetermined threshold. The filter is configured to filter the noise in the wheel speed signal and to output a filtered wheel speed signal to a control system controlling stability of the vehicle.

In other features, the plurality of noise detectors include first, second, and third noise detectors. The first noise detector is configured to detect noise in a bit stream received with the wheel speed signal. The bit stream includes bits generated based on sensing the magnetic material on the encoder. The second noise detector is configured to detect noise in an envelope of the wheel speed signal. The third noise detector is configured to detect noise by detecting peaks in the wheel speed signal using a fast Fourier transform. The noise detected in the wheel speed signal is a combination of the noise detected by the first, second, and third noise detectors.

In another feature, the system further comprises a weight adjusting module configured to dynamically adjust weights of the first, second, and third noise detectors to prevent the noise from skewing the estimate of the state of health of the encoder generated by the estimation module.

In another feature, the weight adjusting module is configured to dynamically adjust the weights of the first, second, and third noise detectors based on one or more of a speed of the vehicle, whether the vehicle is turning, and road conditions.

In other features, the bit stream is truncated when a speed of the vehicle is greater than or equal to a predetermined speed. The weight adjusting module is configured to reduce the weight of the first noise detector and increase the weights of the second and third noise detectors when the speed of the vehicle is greater than or equal to the predetermined speed.

In another feature, the weight adjusting module is configured to increase the weight of the first noise detector relative to the weights of the second and third noise detectors when the vehicle is turning.

In another feature, the weight adjusting module is configured to reduce the weight of the second and third noise detectors relative to the weight of the first noise detector in rough road conditions.

In another feature, the weight adjusting module is configured to increase the weight of the first noise detector and reduce the weight of the second noise detector when a speed of the vehicle is less than or equal to a predetermined speed.

In another feature, the filter is configured to filter the wheel speed signal using a first filter constant when the noise detected in the wheel speed signal is less than or equal to a first threshold and using a second filter constant when the noise is greater than the first threshold, where the second filter constant is greater than the first filter constant.

In another feature, the control system controlling stability of the vehicle includes a braking system, a traction control system, or a stability control system.

In still other features, a method for detecting wear in an encoder used to sense a wheel speed in a vehicle comprises sensing the wheel speed of the vehicle by sensing a magnetic material on the encoder coupled to a wheel of the vehicle. The method comprises detecting noise in a wheel speed signal generated by the sensing using a plurality of noise detectors. The method comprises estimating a state of health of the encoder based on the noise detected in the wheel speed signal. The method comprises generating an alert in response to the state of health indicating that an amount of wear on the encoder is greater than a predetermined threshold. The method comprises filtering the noise in the wheel speed signal to output a filtered wheel speed signal to a control system controlling stability of the vehicle.

In other features, detecting the noise using the plurality of noise detectors comprises detecting noise in a bit stream received with the wheel speed signal using a first noise detector. The bit stream includes bits generated based on sensing the magnetic material on the encoder. Detecting the noise using the plurality of noise detectors comprises detecting noise in an envelope of the wheel speed signal using a second noise detector. Detecting the noise using the plurality of noise detectors comprises detecting noise using a third noise detector by detecting peaks in the wheel speed signal using a fast Fourier transform. Detecting the noise using the plurality of noise detectors comprises combining the noise detected by the first, second, and third noise detectors.

In another feature, the method further comprises dynamically adjusting weights of the first, second, and third noise detectors to prevent the noise from skewing the estimate of the state of health of the encoder.

In another feature, the method further comprises dynamically adjusting the weights of the first, second, and third noise detectors based on one or more of a speed of the vehicle, whether the vehicle is turning, and road conditions.

In other features, the bit stream is truncated when a speed of the vehicle is greater than or equal to a predetermined speed. The method further comprises reducing the weight of the first noise detector and increasing the weights of the second and third noise detectors when the speed of the vehicle is greater than or equal to the predetermined speed.

In another feature, the method further comprises increasing the weight of the first noise detector relative to the weights of the second and third noise detectors when the vehicle is turning.

In another feature, the method further comprises reducing the weight of the second and third noise detectors relative to the weight of the first noise detector in rough road conditions.

In another feature, the method further comprises increasing the weight of the first noise detector and reducing the weight of the second noise detector when a speed of the vehicle is less than or equal to a predetermined speed.

In another feature, the method further comprises filtering the wheel speed signal using a first filter constant when the noise detected in the wheel speed signal is less than or equal to a first threshold and using a second filter constant when the noise is greater than the first threshold, where the second filter constant is greater than the first filter constant.

In another feature, the method further comprises controlling stability of the vehicle by controlling at least one of a braking system, a traction control system, and a stability control system.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1A shows an example of an encoder used to sense wheel speed in a vehicle;

FIG. 1B shows an example of a system for measuring wheel speed using the encoder of FIG. 1A;

FIGS. 5A-5E show examples of various signals received, processed, and generated by the prognostics system of FIG. 2A.

In the drawings, reference numbers may be reused to identify similar and/or identical elements.

DETAILED DESCRIPTION

Figure 2A:
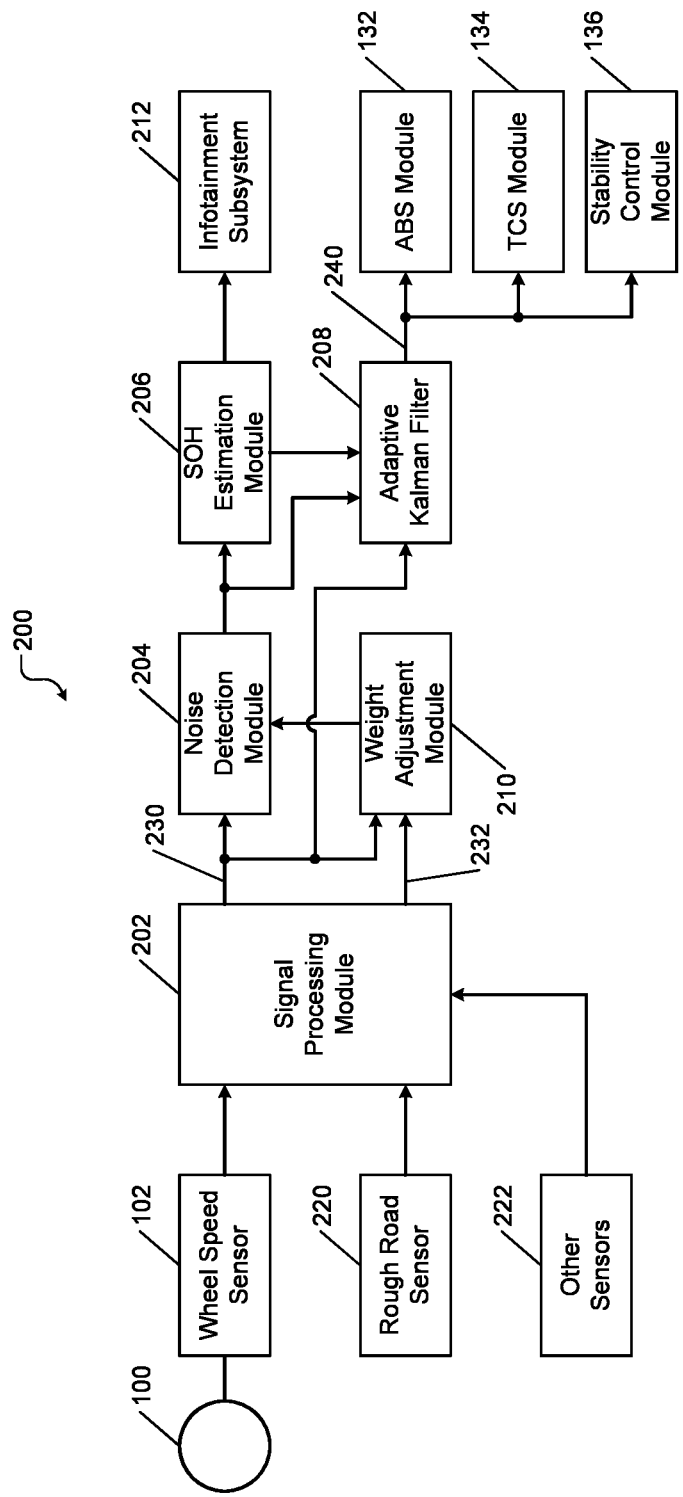
FIG. 2A shows an example of a prognostics system for estimating a health state of the encoder of FIG. 1.

FIGS. 1A and 1B show examples of an encoder, wheel speed sensors, and a wheel speed measuring system. The speed of a wheel of a vehicle is sensed using an encoder 100 and one or more wheel speed sensors 102, 104. In FIG. 1A, the encoder 100 includes a magnetic material arranged around a rim of the encoder 100. The magnetic material is arranged such that a series of north and south poles (examples identified at 110, 112) are radially disposed around the rim of the encoder 100. The magnetic material is laminated for protection from dirt, water, and other elements that can damage the magnetic material. The encoder 100 is fitted to the wheel bearing.

In FIG. 1B, one or more wheel speed sensors 102, 104 are mounted proximate to the rim of the encoder 100. As the wheel rotates, the encoder 100 rotates at the speed of the wheel. The wheel speed sensors 102, 104 detect the magnetic poles on the encoder 100 and generate outputs. A wheel speed measuring system 118 comprises one or more brake control modules (e.g., first and second brake control modules 120, 122). The first and second brake control modules 120, 122 receive the outputs of the wheel speed sensors 102, 104, respectively. Each of the first and second brake control modules 120, 122 independently calculates the speed of the wheel based on the output of the wheel speed sensors 102, 104, respectively.

Each of the first and second brake control modules 120, 122 is connected to a Controlled Area Network (CAN) bus 130 in the vehicle. Each of the first and second brake control modules 120, 122 provides the calculated speed of the wheel to other modules such as an ABS module 132, a TCS module 134, and a stability control module 136 of the vehicle via the CAN bus 130.

In many vehicles, redundancy in wheel speed sensing is provided by using two wheel speed sensors (e.g., elements 102, 104 shown in FIG. 1B) and respective brake control modules (e.g., elements 120, 122 shown in FIG. 1B) that calculate the wheel speed based on data received from the respective wheel speed sensors. However, only one encoder is used. Although laminated, encoders are susceptible to degradation due to wear and tear. If an encoder fails, the wheel speed cannot be sensed. Loss of wheel speed sensing can degrade performance of autonomous vehicles. Inability to proactively detect failures in wheel speed sensing systems can impact safety and drivability of the vehicle and can lower customer experience. Relatively high amount of noise in a wheel speed signal output by the wheel speed sensors due to defects in the sensor-encoder interface can deteriorate performance of ABS, TCS, and stability control of the vehicle.

The present disclosure provides a prognostics system that monitors the health of the encoder, proactively detects degradation in the encoder's health, and provides alerts regarding servicing the encoder before the encoder fails. The prognostics system combines health indicators from a noisy wheel speed signal to detect a health state of the sensor/encoder interface. Based on the measured state of health (SOH) of the sensor/encoder interface, the prognostics system generates a noise-tolerant wheel speed signal using an adaptive Kalman filter to maximize the availability of vehicle stability control features such as ABS and TCS.

Throughout the present disclosure, reference is made to Germany's Verband der Automobilindustrie (VDA), which defines standards for automotive industry. The prognostics system of the present disclosure leverages the ability of the wheel speed sensors to classify dynamic changes in the sensor/encoder interface through a VDA signal to estimate a state of health (SOH) of the encoder. The prognostics system combines the noise determined from envelope- and FFT-based detection processes with the magnetic strength of the encoder derived from a VDA signal to improve the SOH estimate. The prognostics system uses an adaptive Kalman filter to correct the high-noise wheel speed signal to allow an autonomous vehicle to perform its functions.

Specifically, any defect in the wheel speed sensor-encoder interface increases the noise in the wheel speed signal. The prognostics system identifies the noise in the wheel speed signal by combining three different health indicators: a VDA signal, an envelope based process, and a fast Fourier transform (FFT) based process, to obtain a robust SOH estimate.

A noise-tolerant wheel speed signal is produced using an adaptive Kalman filter that allows an autonomous vehicle to perform its operations in the event of mild degradation in wheel speed sensing. These and other features of the prognostics system of the present disclosure are now described below in further detail.

The present disclosure is organized as follows. The prognostics system is shown and described with reference to FIGS. 2A and 2B. A method performed by the prognostics system is shown and described with reference to FIG. 3. Examples of various methods performed by a weigh adjustment module of the prognostics system are shown and described with reference to FIGS. 4A-4D. Various signals received, processed, and generated by the prognostics system are shown in FIGS. 5A-5E and are described during the discussion of FIGS. 2A, 2B, and 3.

Figure 2B:
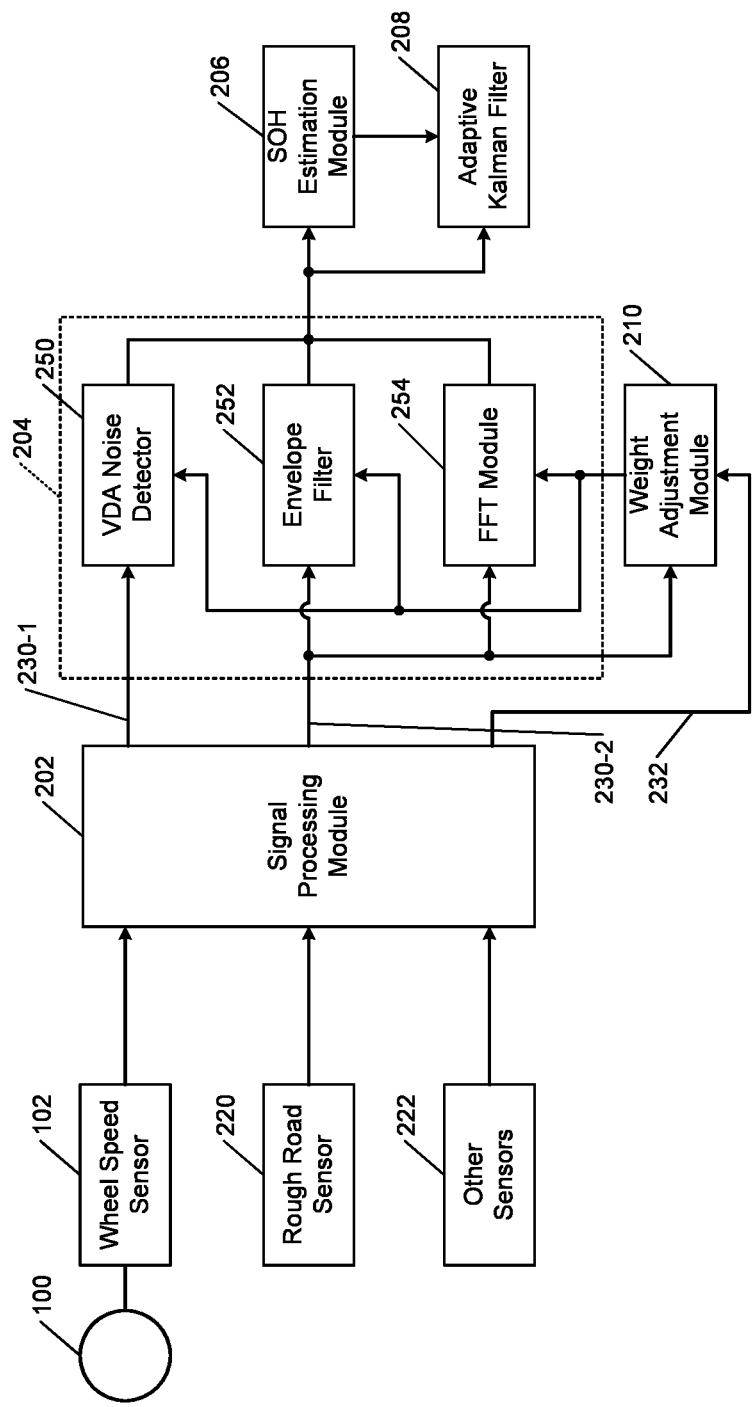
FIG. 2B shows an example of a noise detection module of the prognostics system of FIG. 2A in further detail.

FIGS. 2A and 2B show a prognostics system 200 for determining a state of health (SOH) of the encoder 100 that is used to sense the wheel speed. FIG. 2A shows a block diagram of the prognostics system 200 in its entirety. FIG. 2B shows a noise detection module of the prognostics system 200 in detail. The prognostics system 200 can be implemented in each of the first and second brake control modules 120, 122.

In FIG. 2A, the prognostics system 200 comprises the encoder 100, the wheel speed sensor 102 (or 104), and a signal processing module 202. The prognostics system 200 further comprises a noise detection module 204, an SOH estimation module 206, an adaptive Kalman filter 208, and a weight adjustment module 210. The prognostics system 200 communicates with an infotainment subsystem 212, the ABS module 132, the TCS module 134, and the stability control module 136 of the vehicle. The signal processing module 202 also communicates with a rough road sensor 220 and other sensors 222 of the vehicle.

The signal processing module 202 processes the data received from the wheel speed sensor 102 and generates a wheel speed signal 230. The signal processing module 202 also outputs serial data called a VDA bit stream (explained below with reference to FIG. 2B) along with the wheel speed signal 230. The sensor 102 generates the VDA bit stream. The signal processing module 202 decodes and parses the VDA bit stream. Additionally, the signal processing module 202 processes data received from the rough road sensor 220 and the other sensors 222 of the vehicle and outputs respective signals 232 to the weight adjustment module 210, which is described below in further detail with reference to FIG. 2B.

The noise detection module 204 estimates the amount of noise in the wheel speed signal 230 using various techniques described below in detail with reference to FIG. 2B. The SOH estimation module 206 estimates the SOH of the encoder 100 based on the amount of noise in the wheel speed signal 230 estimated by the noise detection module 204 as described below in detail with reference to FIG. 3. The SOH estimation module 206 provides an alert (e.g. an audiovisual alert) via the infotainment subsystem 212 of the vehicle when the SOH of the encoder 100 degrades severely.

The adaptive Kalman filter 208 filters the noise in the wheel speed signal 230 depending on whether the amount of noise in the wheel speed signal 230 is relatively low or high. When the amount of noise in the wheel speed signal 230 is relatively low (e.g., below a first threshold), the adaptive Kalman filter 208 filters the noise lightly (i.e., using a relatively low filter constant). When the amount of noise in the wheel speed signal 230 is relatively high (e.g., above a second threshold), the adaptive Kalman filter 208 filters the noise using a relatively high filter constant. Accordingly, the adaptive Kalman filter 208 tailors its filter constant to the amount of noise in the wheel speed signal 230 and therefore to the SOH of the encoder 100. The adaptive Kalman filter 208 provides a noise tolerant wheel speed signal 240 to the ABS module 132, the TCS module 134, and the stability control module 136 of the vehicle.

FIG. 2B shows the noise detection module 204 in further detail. The noise detection module 204 employs three independent noise detection techniques to detect the amount of noise in the wheel speed signal 230, which comprises a VDA bit stream 230-1 and a wheel speed signal 230-2. FIG. 5A shows an example of the wheel speed signal 230-2, which is shown as a graph of wheel speed 500 relative to time 502. FIG. 5B shows an example of the VDA bit stream 230-1, which is shown as a graph of a normalized amplitude 504 of pulses of the VDA bit stream 230-1 relative to time 506.

The noise detection module 204 comprises a VDA noise detector 250, an envelope filter 252, and an FFT module 254. The VDA noise detector 250 detects noise in the VDA bit stream 230-1. The envelope filter 252 determines the amount of noise in the wheel speed signal 230-2. The FFT module 254 detects peaks in the wheel speed signal 230-2 (e.g., due to defects in the encoder 100). The VDA noise detector 250, the envelope filter 252, and the FFT module 254 are described below in turn.

The VDA bit stream 230-1 comprises a set of nine bits that are serially output by the wheel speed sensor 102 upon sensing magnetic pole pairs 110, 112 on the encoder 100. As FIG. 5B shows, in the VDA bit stream 230-1, a first bit 510-1 indicates whether an air gap limit is reached, where the air gap refers to a gap between the encoder 100 and the wheel speed sensor 102. A second bit 510-2 indicates a mode of operation of the encoder 100 and the wheel speed sensor 102 (calibrated or un-calibrated). A third bit 510-3 provides an indication of a protocol (standard or advanced) used by the encoder 100 and the wheel speed sensor 102 to provide the VDA bit stream 230-1. A fourth bit 510-4 indicates whether the direction of motion of the wheel indicated by the encoder 100 is valid. A fifth bit 510-5 indicates the direction of motion of the wheel indicated by the encoder 100 (clockwise or counterclockwise). The sixth, seventh, and eight bits 510-6, 510-7, and 510-8 (collectively shown as 510-6, 7, 8) indicate a magnetic strength (air gap) of the magnetic poles on the encoder 100 sensed by the wheel speed sensor 102. A ninth bit 510-9 is a parity bit. The nine bits 510-1 to 510-9 are collectively called the VDA bits 510.

The VDA noise detector 250 detects the amount of noise in the VDA bits 510, which can be used to estimate the health of the encoder 100. The VDA bits 510 include noise depending on the vehicle's operation and road conditions. For example, the fourth and fifth bits 510-4, 510-5 can include jitter that can indicate wear in the encoder 100. For example, if the sixth, seventh, and eighth bits 510-6, 510-7, and 510-8 indicate that the magnetic strength (air gap) is increasing and decreasing frequently, such an inconsistent pattern can indicate wear in the encoder 100. In general, the content as well as the pattern of the VDA bits 510 detected by the VDA noise detector 250 can be indicative of the health of the encoder 100.

The envelope filter 252 determines a normalized amount of noise in the wheel speed signal 230-2. FIG. 5C shows a graph of wheel speed 500 relative to time 502 and shows an envelope 520 of the wheel speed signal 230-2. The envelope filter 252 determines a normalized noise 522 in the envelope 520.

The FFT module 254 converts the wheel speed signal 230-2 into frequency domain and detects peaks in the wheel speed signal 230-2. FIG. 5D shows a graph of power spectral density 530 of the wheel speed signal 230-2 relative to frequency 532. The FFT module 254 detects a peak 534 in the wheel speed signal 230-2 having a magnitude greater than a predetermined threshold. For example, the peak 534 may occur due to faults in the encoder 100, which can occur due to deposition of contaminants and/or other wear and tear of the encoder 100.

The weight adjustment module 210 adjusts the weights of the VDA noise detector 250, the envelope filter 252, and the FFT module 254. The noise in the wheel speed signal 230 varies depending on various factors. For example, the noise varies based on the vehicle's operation (e.g., vehicle speed, whether the vehicle is turning, etc.), which can be sensed by the other sensors 222 of the vehicle. Additionally, the noise varies depending on road conditions. For example, rough road conditions may include potholes, rumble strips, etc. encountered by the wheel, which can be sensed by the rough road sensor 220.

Various other factors related to the vehicle's operation and road conditions are sensed by the other sensors 222 of the vehicle. The weight adjustment module 210 adjusts the weights of the VDA noise detector 250, the envelope filter 252, and the FFT module 254 depending on these factors.

For example, at relatively low vehicle speeds, the wheel speed signal 230 can include a relatively high amount of noise. Accordingly, at relatively low vehicle speeds, the envelope filter 252 may detect the relatively high amount of noise, which may not reliably indicate the health of the encoder 100. For example, at relatively low vehicle speeds, the SOH estimation module 206 may misinterpret the relatively high amount of noise detected by the envelope filter 252 in the wheel speed signal 230-2 as an indication wear in the encoder 100. To avoid such a skewed determination or detection of a false positive by the SOH estimation module 206, the weight adjustment module 210 can reduce the weight of the envelope filter 252 at relatively low vehicle speeds.

On the other hand, at lower vehicle speeds, the VDA bits can include relatively low amount of noise than at higher vehicle speeds. Accordingly, the weight adjustment module 210 can increase the weight of the VDA noise detector 250 at relatively low vehicle speeds. Further, when the vehicle is turning, the vehicle's speed is typically relatively low, and the VDA bits 510 can include relatively low amount of noise. Accordingly, the weight adjustment module 210 can increase the weight of the VDA noise detector 250 when the vehicle is turning, which can be detected by the other sensors 222.

Conversely, at relatively high vehicle speeds, the VDA bit stream is generally truncated (i.e., not all of the VDA bits 510 are output with the wheel speed signal 230). Therefore, potentially incorrectly inferring wear on the encoder 100 based on the truncated VDA bit stream can generate false positives. Accordingly, the weight adjustment module 210 can reduce the weight of the VDA noise detector 250 and increase the weight of the envelope filter 252 and the FFT module 254 at relatively high vehicle speeds.

As another example, in rough road conditions, the FFT module 254 and the envelope filter 252 may detect noise in the wheel speed signal 230-2. Therefore, incorrectly inferring wear on the encoder 100 based on the noise detected by the FFT module 254 and the envelope filter 252 in the wheel speed signal 230-2 can also generate false positives. Accordingly, the weight adjustment module 210 can reduce the weight of the FFT module 254 and the envelope filter 252 when rough road conditions are detected.

In general, the weight adjustment module 210 can dynamically adjust the weights of the VDA noise detector 250, the envelope filter 252, and the FFT module 254 depending on factors such as the vehicle's speed, whether the vehicle is turning, road conditions, and so on to prevent the SOH estimation module 206 from detecting false positives and skewing the estimation of the health state of the encoder 100. The SOH estimation module 206 determines the health of the encoder 100 based on the amount of noise estimated by the noise detection module 204 as follows.

Figure 3:
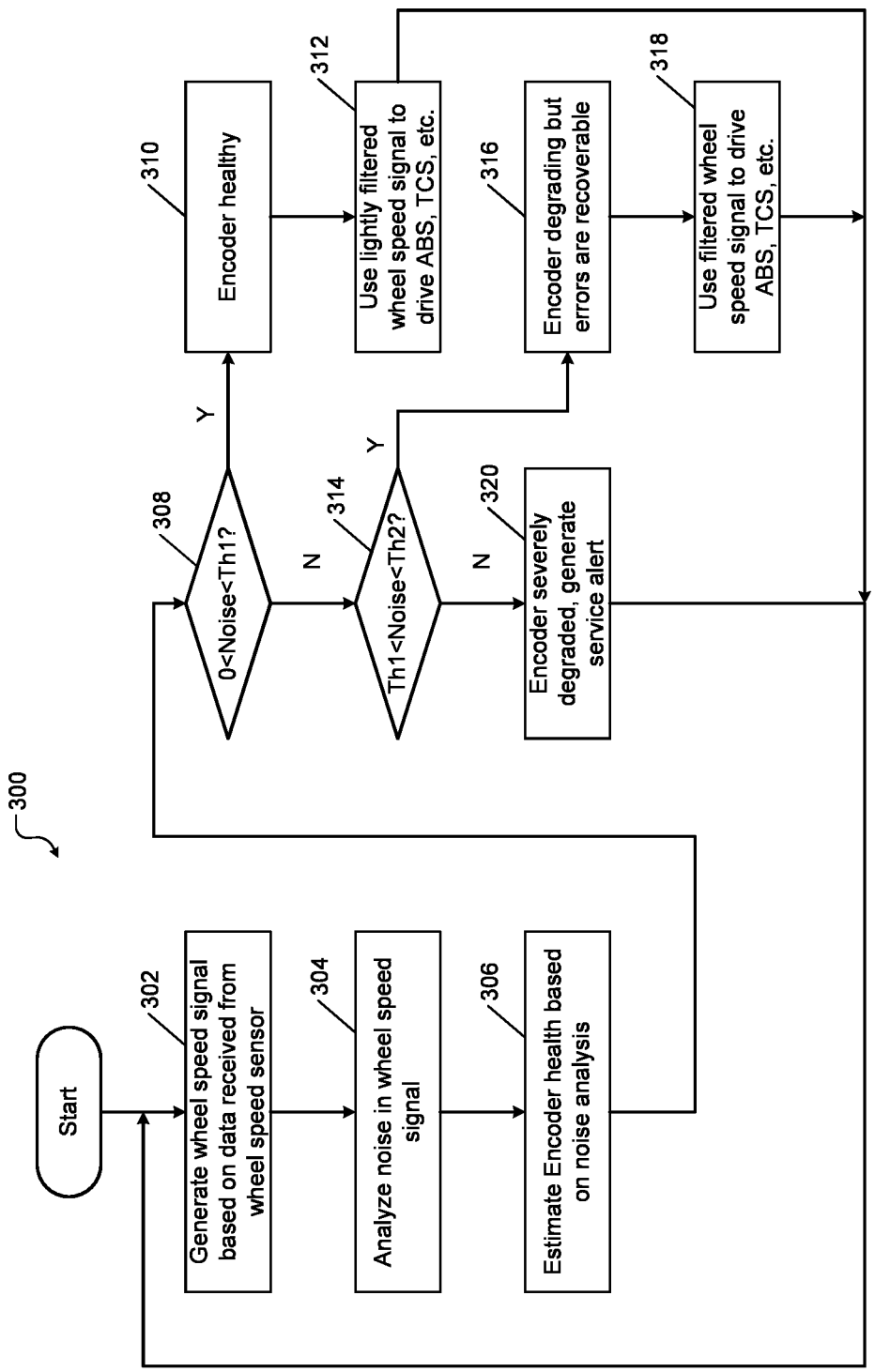
FIG. 3 shows an example of a method performed by the prognostics system of FIG. 2A for estimating a health state of the encoder of FIG. 1.

FIG. 3 shows a method 300 performed by the prognostics system 200. For example, one or more components of the prognostics system 200 can perform the steps of the method 300. Accordingly, the term control used in the following description refers to one or more components of the prognostics system 200.

At 302, control (e.g., the signal processing module 202) generates the wheel speed signal 230 based on the data received from the wheel speed sensor 102 that is coupled to the encoder 100. At 304, control (e.g., the noise detection module 204) detects and analyzes the noise in the wheel speed signal 230. At 306, control (e.g., the SOH estimation module 206) estimates the health of the encoder 100 based on the noise analysis.

At 308, control (e.g., the SOH estimation module 206) determines if the noise in the wheel speed signal 230 is less than a first threshold (Th1). If the noise is less than a first threshold (Th1), at 310, control (e.g., the SOH estimation module 206) determines that the encoder 100 is healthy (i.e., has no defects or wear and is operating normally). At 312, control (e.g., the adaptive Kalman filter 208) lightly filters the wheel speed signal 230 (i.e., using a relatively low filter constant) and provides the lightly filtered wheel speed signal 230 to one or more control systems (e.g., the ABS module 132, the TCS module 134, and the stability control module 136) of the vehicle. Control returns to 302.

If the noise in the wheel speed signal 230 is greater than the first threshold (Th1), at 314, control (e.g., the SOH estimation module 206) determines if the noise in the wheel speed signal 230 is less than a second threshold (Th2), where Th2>Th1. If the noise in the wheel speed signal 230 is greater than the first threshold (Th1) but less than the second threshold (Th2), at 316, control (e.g., the SOH estimation module 206) determines that the encoder 100 is degrading (i.e., the encoder 100 has some amount of wear or defects) but the errors due to degradation are recoverable (i.e., the amount of the wear is less than a predetermined threshold).

At 318, control (e.g., the adaptive Kalman filter 208) increases the filter constant and filters the wheel speed signal 230 with a relatively high amount of filtering (i.e., using the relatively higher filter constant). Control (e.g., the adaptive Kalman filter 208) provides the relatively highly filtered wheel speed signal 230 to one or more control systems (e.g., the ABS module 132, the TCS module 134, and the stability control module 136) of the vehicle. Control returns to 302.

If the noise in the wheel speed signal 230 is greater than the second threshold (Th2), at 320, control (e.g., the SOH estimation module 206) determines that the encoder is severely or significantly degraded (i.e., the amount of the wear is greater than the predetermined threshold). Control (e.g., the SOH estimation module 206) generates an alert (e.g., displays a message to schedule service on the infotainment subsystem 212). Control returns to 302.

FIG. 5E shows an example of the health state of the encoder determined by the SOH estimation module 206.

FIG. 5E shows the health state in terms of a graph of the amount of noise 540 in the wheel speed signal 230 detected by the noise detection module 204 relative to the wheel speed 542. In the graph shown in FIG. 5E, a region 544 indicates a severely degraded health state of the encoder 100, where the errors due to the degradation are irrecoverable. A region 546 indicates a moderately degraded health state of the encoder 100, where the errors due to degradation are recoverable. A region 548 indicates a healthy state of the encoder 100, where the error rate is relatively low (e.g., less than a predetermined threshold).

FIGS. 4A-4D show various examples of methods performed by the weight adjustment module 210. The weight adjustment module 210 performs these methods concurrently to dynamically adjust the weights of the VDA noise detector 250, the envelope filter 252, and the FFT module 254 depending on factors such as the vehicle's speed, whether the vehicle is turning, road conditions, and so on, to prevent the SOH estimation module 206 from detecting false positives and skewing the estimation of the health state of the encoder 100.

Figure 4C:
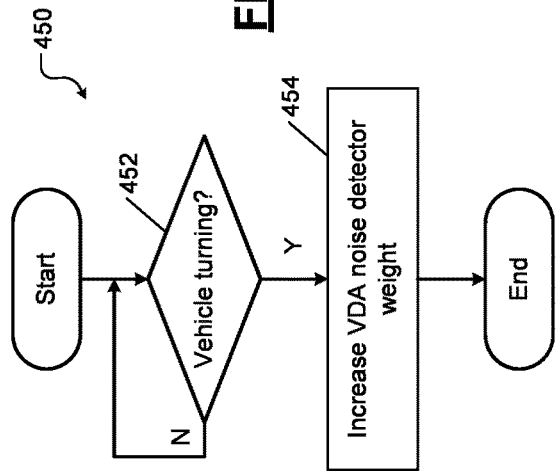
FIGS. 4A-4D show examples of various methods performed by a weigh adjustment module of the prognostics system of FIG. 2A.
Figure 4D:
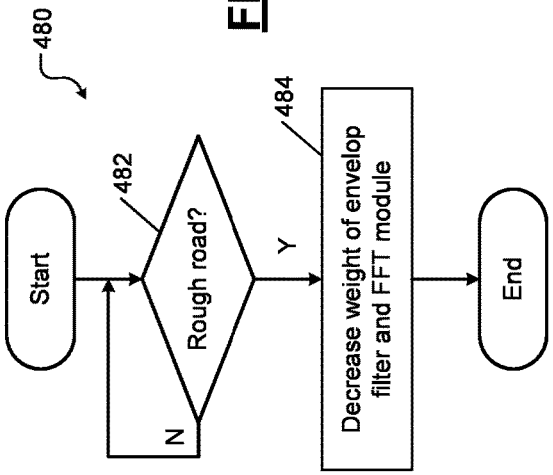
Figure 4B:
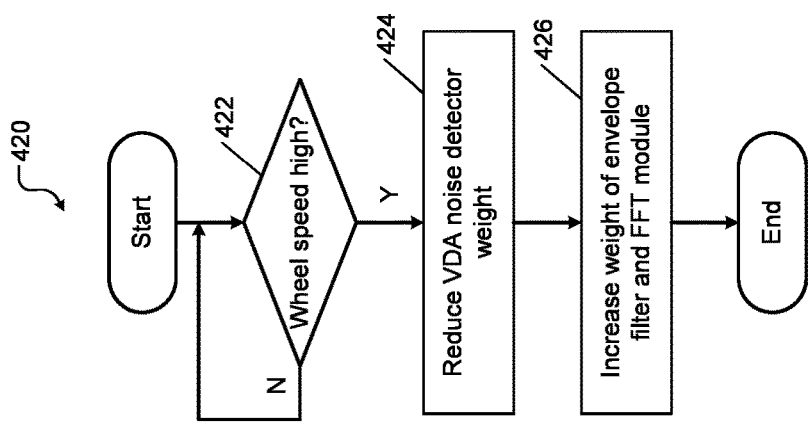
Figure 4A:
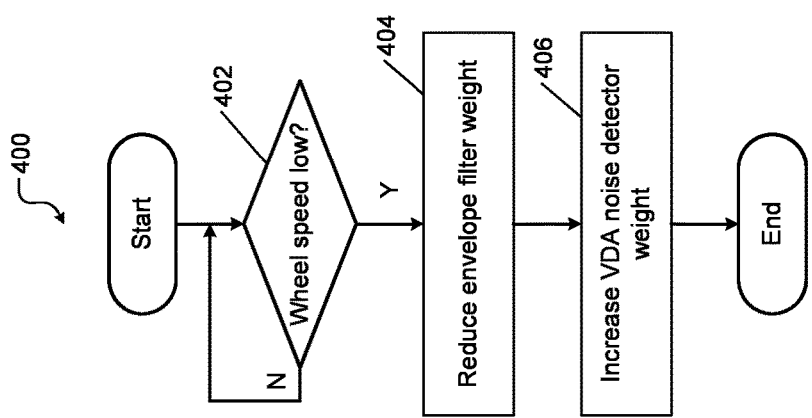

In FIG. 4A, the weight adjustment module 210 performs a method 400 as follows. At 402, the weight adjustment module 210 determines if the wheel speed is relatively low (e.g., less than a first speed). If the wheel speed is relatively low, at 404, the weight adjustment module 210 reduces the weight of the envelope filter 252. At 406, the weight adjustment module 210 increases the weight of the VDA noise detector 250. The method 400 ends.

In FIG. 4B, the weight adjustment module 210 performs a method 420 as follows. At 422, the weight adjustment module 210 determines if the wheel speed is relatively high (e.g., greater than a second speed, which is greater than the first speed). If the wheel speed is relatively high, at 424, the weight adjustment module 210 reduces the weight of the VDA noise detector 250. At 426, the weight adjustment module 210 increases the weights of the envelope filter 252 and the FFT module 254. The method 420 ends.

In FIG. 4C, the weight adjustment module 210 performs a method 450 as follows. At 452, the weight adjustment module 210 determines if the vehicle is turning (e.g., based on one of the signals 232 received from the signal processing module 202). If the vehicle is turning, at 454, the weight adjustment module 210 increases the weight of the VDA noise detector 250, and the method 450 ends.

In FIG. 4D, the weight adjustment module 210 performs a method 480 as follows. At 482, the weight adjustment module 210 determines if rough road condition is detected (e.g., based on one of the signals 232 received from the signal processing module 202). If rough road condition is detected, at 484, the weight adjustment module 210 decreases the weight of the envelope filter 252 and the FFT module 254, and the method 450 ends.

Accordingly, the prognostics system 200 provides two levels of controls to detect the wear in the encoder 100 and to mitigate effects of the wear in the encoder 100. A first level of control is provided by the weight adjustment module 210, which dynamically adjusts the weights of the VDA noise detector 250, the envelope filter 252, and the FFT module 254 to correctly detect the SOH and therefore wear in the encoder 100 as described above. A second level of control is provided by the adaptive Kalman filter 208, which selectively filters the wheel speed signal 230 based on the amount of the noise detected by the noise detection module 204 to mitigate the effects of the wear in the encoder 100. Further, the prognostics system 200 proactively provides an alert when the wear in the encoder 100 becomes greater than a predetermined threshold, which allows servicing the encoder 100 before it fails, which in turn prevents the vehicle stability features (e.g., ABS, TCS, etc.) from being disabled.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for detecting wear in an encoder used to sense a wheel speed in a vehicle, the system comprising:
   a sensor configured to sense the wheel speed of the vehicle by sensing a magnetic material on the encoder coupled to a wheel of the vehicle;
   a noise detection module including a plurality of noise detectors configured to detect noise in a wheel speed signal generated by the sensor;
   an estimation module configured to:
      estimate a state of health of the encoder based on the noise detected in the wheel speed signal; and
      generate an alert in response to the state of health indicating that an amount of wear on the encoder is greater than a predetermined threshold; and
   a filter configured to filter the noise in the wheel speed signal and to output a filtered wheel speed signal to a control system controlling stability of the vehicle.

2. The system of claim 1 wherein the plurality of noise detectors include:
   a first noise detector configured to detect noise in a bit stream received with the wheel speed signal, wherein the bit stream includes bits generated based on sensing the magnetic material on the encoder;
   a second noise detector configured to detect noise in an envelope of the wheel speed signal; and
   a third noise detector configured to detect noise by detecting peaks in the wheel speed signal using a fast Fourier transform,
   wherein the noise detected in the wheel speed signal is a combination of the noise detected by the first, second, and third noise detectors.

3. The system of claim 2 further comprising a weight adjusting module configured to dynamically adjust weights of the first, second, and third noise detectors to prevent the noise from skewing the estimate of the state of health of the encoder generated by the estimation module.

4. The system of claim 3 wherein the weight adjusting module is configured to dynamically adjust the weights of the first, second, and third noise detectors based on one or more of a speed of the vehicle, whether the vehicle is turning, and road conditions.

5. The system of claim 3 wherein the bit stream is truncated when a speed of the vehicle is greater than or equal to a predetermined speed and wherein the weight adjusting module is configured to reduce the weight of the first noise detector and increase the weights of the second and third noise detectors when the speed of the vehicle is greater than or equal to the predetermined speed.

6. The system of claim 3 wherein the weight adjusting module is configured to increase the weight of the first noise detector relative to the weights of the second and third noise detectors when the vehicle is turning.

7. The system of claim 3 wherein the weight adjusting module is configured to reduce the weight of the second and third noise detectors relative to the weight of the first noise detector in rough road conditions.

8. The system of claim 3 wherein the weight adjusting module is configured to increase the weight of the first noise detector and reduce the weight of the second noise detector when a speed of the vehicle is less than or equal to a predetermined speed.

9. The system of claim 1 wherein the filter is configured to filter the wheel speed signal using a first filter constant when the noise detected in the wheel speed signal is less than or equal to a first threshold and using a second filter constant when the noise is greater than the first threshold, wherein the second filter constant is greater than the first filter constant.

10. The system of claim 1 wherein the control system controlling stability of the vehicle includes a braking system, a traction control system, or a stability control system.

11. A method for detecting wear in an encoder used to sense a wheel speed in a vehicle, the method comprising:
sensing the wheel speed of the vehicle by sensing a magnetic material on the encoder coupled to a wheel of the vehicle;
detecting noise in a wheel speed signal generated by the sensing using a plurality of noise detectors;
estimating a state of health of the encoder based on the noise detected in the wheel speed signal;
generating an alert in response to the state of health indicating that an amount of wear on the encoder is greater than a predetermined threshold; and
filtering the noise in the wheel speed signal to output a filtered wheel speed signal to a control system controlling stability of the vehicle.

12. The method of claim 11 wherein detecting the noise using the plurality of noise detectors comprises:
detecting noise in a bit stream received with the wheel speed signal using a first noise detector, wherein the bit stream includes bits generated based on sensing the magnetic material on the encoder;
detecting noise in an envelope of the wheel speed signal using a second noise detector;
detecting noise using a third noise detector by detecting peaks in the wheel speed signal using a fast Fourier transform; and
combining the noise detected by the first, second, and third noise detectors.

13. The method of claim 12 further comprising dynamically adjusting weights of the first, second, and third noise detectors to prevent the noise from skewing the estimate of the state of health of the encoder.

14. The method of claim 13 further comprising dynamically adjusting the weights of the first, second, and third noise detectors based on one or more of a speed of the vehicle, whether the vehicle is turning, and road conditions.

15. The method of claim 13 wherein the bit stream is truncated when a speed of the vehicle is greater than or equal to a predetermined speed, the method further comprising reducing the weight of the first noise detector and increasing the weights of the second and third noise detectors when the speed of the vehicle is greater than or equal to the predetermined speed.

16. The method of claim 13 further comprising increasing the weight of the first noise detector relative to the weights of the second and third noise detectors when the vehicle is turning.

17. The method of claim 13 further comprising reducing the weight of the second and third noise detectors relative to the weight of the first noise detector in rough road conditions.

18. The method of claim 13 further comprising increasing the weight of the first noise detector and reducing the weight of the second noise detector when a speed of the vehicle is less than or equal to a predetermined speed.

19. The method of claim 11 further comprising filtering the wheel speed signal using a first filter constant when the noise detected in the wheel speed signal is less than or equal to a first threshold and using a second filter constant when the noise is greater than the first threshold, wherein the second filter constant is greater than the first filter constant.

20. The method of claim 11 further comprising controlling stability of the vehicle by controlling at least one of a braking system, a traction control system, and a stability control system.

* * * * *